(12) United States Patent
Mittal et al.

(10) Patent No.: US 7,711,709 B2
(45) Date of Patent: May 4, 2010

(54) EFFICIENT STORING AND QUERYING OF SNAPSHOT MEASURES

(75) Inventors: Ashish Mittal, Sunnyvale, CA (US); Edward S. Suen, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 904 days.

(21) Appl. No.: 11/314,733

(22) Filed: Dec. 21, 2005

(65) Prior Publication Data

US 2006/0253414 A1    Nov. 9, 2006

Related U.S. Application Data

(60) Provisional application No. 60/639,743, filed on Dec. 27, 2004.

(51) Int. Cl.
*G06F 17/00* (2006.01)
(52) U.S. Cl. .................. 707/639; 707/649; 707/657
(58) Field of Classification Search .............. 707/1, 707/3, 4, 10, 203
See application file for complete search history.

(56) References Cited

U.S. PATENT DOCUMENTS 5,317,731 A *   5/1994  Dias et al. ................... 707/8
5,369,757 A *  11/1994  Spiro et al. ................. 714/19
5,701,480 A *  12/1997  Raz ........................... 714/19
6,205,450 B1*   3/2001  Kanome ...................... 707/203
6,311,193 B1*  10/2001  Sekido ........................ 707/202
6,792,556 B1*   9/2004  Dennis ......................... 714/6
2004/0103084 A1*   5/2004  Megerian ...................... 707/3
2005/0028025 A1*   2/2005  Zalewski et al. ............... 714/6
2006/0036655 A1*   2/2006  Lastovica .................... 707/203
2006/0036676 A1*   2/2006  Cardone et al. .............. 709/203
2007/0226730 A1*   9/2007  Coyle et al. ................. 717/170

* cited by examiner

*Primary Examiner*—Charles Rones
*Assistant Examiner*—Rezwanul Mahmood
(74) *Attorney, Agent, or Firm*—Campbell Stephenson LLP

(57) ABSTRACT

A facility for efficiently storing and querying snapshot measures from a relational data warehouse is provided. The facility allows for the efficient query of measures at any given point in time by efficiently modeling snapshot measures. In one technique, the facility stores periodic snapshots of a metric at longer time intervals, and computes intermediate snapshots of the metric as necessary in between these time intervals. Under this technique, the facility can compute an intermediate snapshot measure of a metric for any specified time by determining the last snapshot measure of the metric from the most recent periodic snapshot, and adding to the last snapshot measure the value of the changes to the metric that happened since the time of the most recent periodic snapshot and the specified time.

6 Claims, 5 Drawing Sheets

EFFICIENT STORING AND QUERYING OF SNAPSHOT MEASURES

RELATED APPLICATIONS

This application claims the benefit of priority under 35 U.S.C. §119(e) of U.S. Provisional Application No. 60/639,743 filed on Dec. 27, 2004, the entirety of which is incorporated herein by reference.

TECHNICAL FIELD

The described technology is directed generally to database queries and, more particularly, to efficiently performing a query of snapshot measures.

BACKGROUND

A database is a collection of data. A user typically stores, retrieves and modifies the data in a database using a computer program, such as a database management system (DBMS).

One type of DBMS is a relational data base management system, which stores information in tables. A table is a series of intersecting rows and columns. The rows of a table typically represent records, which are collections of information about particular items, and the columns typically represent fields, which specify particular attributes of a record—e.g., a particular type of data that is contained in each field of the record. Each field contains the data having the particular attribute for the intersecting row and column.

The data stored in the tables of a relational database is commonly accessed and retrieved using a query and analysis tool. For example, a user can use the tool to perform specific operations on the tables, rows, and on individual data elements. One type of operation is an aggregation operation, and one such aggregation function is called a distinct count.

Online Analytical Processing (OLAP) generally refers to a category of software tools that provides analysis of data stored in a database. Users use the OLAP tools to analyze different dimensions of multimedia data, such as time series and trend analysis. In the business domain, OLAP is typically used to analyze transactional metrics, which are those metrics measured over an interval of time, and snapshot metrics, which are those metrics measured at a particular point of time. Common examples of these metrics can be found in the financial statements of companies, such as a profit and loss statement and a balance sheet. Other examples of snapshot measures include (1) number of open accounts by date for a bank, (2) number of open bugs by date for a quality application, (3) inventory by part for a supply chain application, (4) traditional interval measures with a known start date—e.g., revenue to date—can also be modeled as snapshot measures, etc.

These measures present unique challenges in data modeling. First, these measures are typically voluminous if stored completely, and its size can grow very rapidly. For example, even though the number of transactions for an organization that does no business for a year will not grow, its snapshots will continue to have records added to them with the passing of time. Second, the added size of the number of records usually adds to query time, as well as to extract, transform and load (ETL) times. ETL is a process in data warehousing that involves extracting data from outside resources, transforming it to fit business needs, and loading it into a data warehouse. Third, the measures are not typically cumulative. Although databases suitably handle sum, counts and averages, non-cumulative measures require special handling by the OLAP tools.

Conventional approaches are not yet able to efficiently model snapshots.

DETAILED DESCRIPTION

Figure 1:
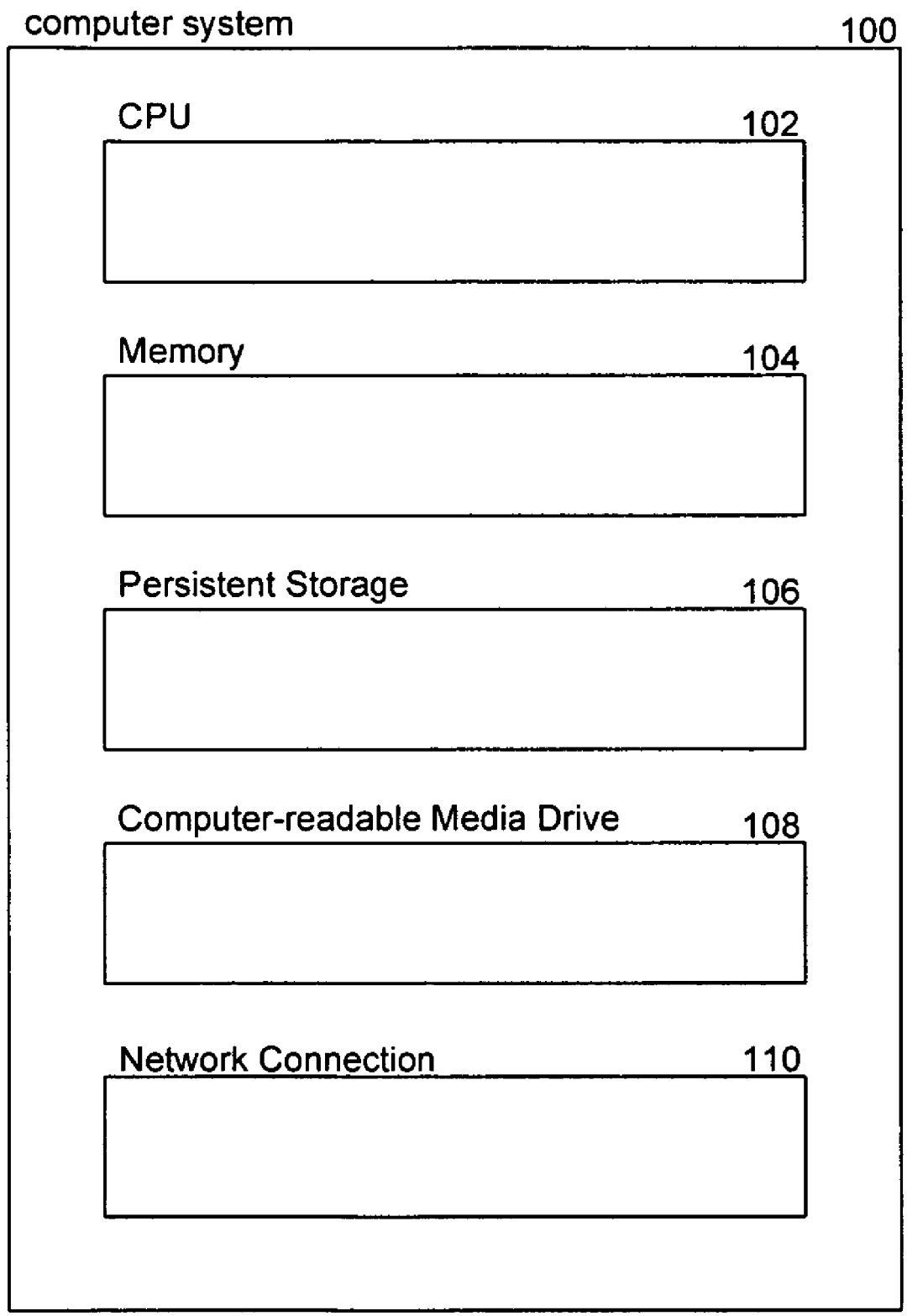
FIG. 1 is a block diagram illustrating selected components typically incorporated in at least some of the computer systems on which the facility executes.

A software facility (the "facility") for efficiently storing and querying snapshot measures from a relational data warehouse is provided. By efficiently storing the snapshot measures, the facility allows for the efficient query of measures at any given point in time, where the measures may, for example, describe a metric, such as the state of a business.

Throughout the description, the following terms will generally have the following meanings:

The term "base table" or "detail table" or "fact table" refers to a database table that contains the details data.

The term "data warehouse" refers to a record of an enterprise's past transactional and operational information, stored in a database designed to favor efficient data analysis and reporting.

The term "cube" refers to a multidimensional structure that contains dimensions and measures. Dimensions define the structure of the cube. Measures provide the numerical values of interest. Typically, the edges of a cube contain dimension values, and the body of a cube contains measure values.

The term "dimension" refers to a structural attribute of a cube, which is an organized hierarchy of categories (levels) that describes data in fact tables. These categories typically describe a similar set of members upon which an analysis is performed. A dimension is a field (column) that you can aggregate over. For example, a time dimension might include levels for year, month, and day. Typically, a dimension is associated with one or more hierarchies.

The term "edge" refers to one side of a cube. Each edge contains values from one or more dimensions.

The term "fact" refers to a value that is based on a column in a fact table. The term "fact" is typically used in relational databases.

The term "granularity" or "grain" refers to a degree of specificity of information contained in a data element.

The term "hierarchy" refers to a logical structure that organizes the members of a dimension in ordered levels such that each member has one parent and zero or more child members. The hierarchy can be expanded or collapsed by drilling down or up on its levels, respectively.

The term "level" or "category" refers to a name of a set of members in a dimension hierarchy such that all members of the set are at the same distance from the root of the hierarchy. For example, a time dimension might include levels for year, month, and day.

The term "measure" refers to, in a cube, a set of values that are based on a column in the cube's fact table. Measures are the central values that are aggregated and analyzed. Typically, a measure includes data, usually numeric and additive, that can be examined and analyzed, and is categorized by one or more dimensions. The term "measure" is typically used in multidimensional applications.

The term "query" refers to a question a user "asks" a database in order to get information in a useful format.

The term "schema" refers to a collection of relational database objects.

The term "snapshot" refers to a measurement at a particular point in time.

The term "snapshot fact" refers to a measurable quantity.

The term "table" refers to a two-dimensional object, comprising rows and columns, used to store data in a relational database. It is a presentation of information organized in rows and columns.

In some embodiments, the facility stores periodic snapshots of a metric, such as a business metric, at longer time intervals, and computes intermediate snapshots of the metric as necessary in between these time intervals. The facility allows for storing periodic snapshots which are course grained in time (e.g., weekly, monthly, etc.). The interval for the snapshot needs to be carefully chosen. If the interval is very fine-grained, little is gained over performing daily snapshots, and the snapshot queries can be very slow. On the other hand, too course a grain makes snapshot queries fast, but will slow down the transaction queries. The facility may also allow for not including the less common dimensions in the periodic snapshots to make the snapshots manageable. The facility can then compute an intermediate snapshot measure of a metric as necessary—i.e., compute a snapshot fact of the metric for any specified time—by determining the last snapshot measure of the metric from the most recent periodic snapshot, and adding to the last snapshot measure the value of the transactions—i.e., the changes to the metric—that happened since the time of the most recent periodic snapshot and the specified time. A technical advantage of the technique of storing periodic snapshots and adding transactions (i.e., accounting for changes) allows the facility to obtain a snapshot of a metric for any specified time without having to store any additional measures other than the periodic snapshots. This technique is suited to volatile metrics—i.e., data. Storing snapshots at longer intervals considerably reduces the size of the snapshot. For example, storing monthly snapshots instead of daily snapshots reduces the snapshot fact by a factor of 30. The snapshot fact may be for a metric that defines a state of the business at a given point of time. Examples of a metric include balance in a bank account, or inventory for a given part. Snapshot facts cannot typically be added across time. For example, your bank balance at the end of the month is not the total of your balances on the 1st, 2nd etc. Also, the ETL needs to be run once in thirty days, which makes daily loads much faster.

In some embodiments, the facility stores snapshots of a metric by interval instead of by date. This technique is suited to fairly non-volatile metrics, such as "number of open accounts," "number of open bugs," and the like. For example, instead of taking snapshots at periodic intervals, snapshots are recorded when a change in the state occurs—i.e., a change occurs in the metric. A change in state occurs, for example, when a snapshot fact changes. The facility records a time period—e.g., a start time and an end time—for the snapshot. The facility can then compute an intermediate snapshot measure of a metric at a specified time by identifying the snapshot whose time period encompasses the specified time, and reading the snapshot measure from the identified snapshot. This technique may dramatically impact both the size of the snapshot table and on the ETL performance, since only snapshots that have changed have to be loaded. Moreover, this technique does not preclude setting the grain of the snapshot measurement to be something other than day. For example, the snapshot can be modeled in weekly intervals, and daily snapshots can be computed by adding the details from the transaction star. A transaction star generally refers to a database storage technique which utilizes multiple related tables, such as fact tables and dimension tables. The relationship may be defined through metadata. For example, for a banking application, one table may be for the bank address, another table for account balance, still another table for account holder information, etc.

In some embodiments, the facility allows for combining the periodic snapshot technique and the interval snapshot technique. A user can use the facility to (1) create periodic snapshots—e.g., weekly snapshots instead of daily snapshots—thus, reducing the volume of data, and (2) divide separate metrics into categories of "volatile" and "non-volatile" and model the separate metrics accordingly based on their categorization. For example, in the case of inventory, the user can use the facility to store periodic snapshots of the volatile parts, and store interval snapshots of the non-volatile parts. The facility can then compute an intermediate snapshot measure of a metric at a specified time by determining the technique that was used to model the snapshot measure, and using the computation process that is appropriate for the determined technique. For example, if the facility modeled the snapshot measure using the periodic snapshot technique, the facility can compute the intermediate snapshot measure at the specified time by determining the last snapshot measure from the most recent periodic snapshot, and adding to the last snapshot measure the value of the transactions that happened since the time of the most recent periodic snapshot and the specified time. If, on the other hand, the facility modeled the snapshot measure using the interval snapshot technique, the facility can compute the intermediate snapshot measure at the specified time by identifying the snapshot whose time period encompasses the specified time, and reading the snapshot measure from the identified snapshot.

Both the aforementioned periodic snapshot technique and the interval snapshot technique required the use of a range query (by time) to compute an intermediate snapshot measure at a specified time. For example, in the periodic snapshot technique, the range query may have been used to determine, for each date, the transactions that occurred after the most recent snapshot. In the interval snapshot technique, the range query may have been used to determine, for each date, the interval for which the snapshot is known and that applies to the date being queried. Depending on the target database, range queries can be significantly slower than equality queries.

In some embodiments, the facility eliminates the range queries that are associated with the aforementioned periodic snapshot technique and the interval snapshot technique by pre-computing or materializing the range queries. The facility materializes the range queries by introducing some redundancy, in the form of one or more additional tables, in the data model. For example, to eliminate the range query associated with the periodic snapshot technique, the facility can maintain an additional table that records the interim days (i.e., a specification of a predetermined time period) between a date (i.e., any date) and the most recent snapshot date (i.e., the date of the last snapshot measure) prior to the date. The additional table contains a row (i.e., record) for each interim date between the particular date and the most recent snapshot date. The analysis to determine which rows to include for which query date is independent of other dimensions, such as, by way of example, product, and hence can be pre-computed into a table and indexed. The facility can compute the intermediate snapshot measure of a metric at a specified date by determining the last snapshot measure from the most recent periodic snapshot, identifying the interim dates between the most recent snapshot and the specified date, determining the value of the change to the metric that occurred on each interim date, and adding to the last snapshot measure the values of the changes to the metric that occurred on each interim date. The facility can determine the value of the changes to the metric that occurred on each interim date using equality conditions, which eliminates the use of the range query.

To eliminate the range query associated with the interval snapshot technique, the facility can maintain an additional table that records the days between a snapshot date and the date preceding the next succeeding snapshot date. For each pair of successive snapshots, the additional table contains a row (i.e., record) for each possible query date between a snapshot date and the date preceding the next succeeding snapshot date. The facility can pre-compute the snapshot measure for all rows between the snapshot dates. The facility can compute the intermediate snapshot measure of a metric at a specified date by identifying the record that corresponds to the specified date (i.e., the specified date is used as the query date), and determining the snapshot measure from the identified record.

In some embodiments, the facility pre-computes the relevant dates in order to reduce query times. The facility models the pre-compute relevant dates technique in the metadata by creating aggregate dimensions for each level in the time hierarchy, and in each row of each aggregate, creating a column for the relevant date—e.g., last day—in that period. This can then be used to join to the snapshot table as in the aforementioned techniques. Then, on receiving a query, the facility can select the most aggregate source for the dimension, and perform a query for the relevant dates. For example, to aggregate the snapshots for each month in a year, the facility can maintain a helper table that stores the last day of each of the months (i.e., relevant dates) in the year. Then, to process a query for monthly snapshots of a metric in the year, the facility can use the helper table to determine the last day of each of the months (the relevant dates) in the year, and retrieve only the measures for these specified days.

The various embodiments of the facility and its advantages are best understood by referring to FIGS. 1-5 of the drawings. The elements of the drawings are not necessarily to scale, emphasis instead being placed upon clearly illustrating the principles of the invention. Throughout the drawings, like numerals are used for like and corresponding parts of the various drawings.

FIG. 1 is a block diagram illustrating selected components typically incorporated in at least some of the computer systems on which the facility executes. These computer systems 100 may include one or more central processing units ("CPUs") 102 for executing computer programs; a computer memory 104 for storing programs and data—including data structures—while they are being used; a persistent storage device 106, such as a hard drive, for persistently storing programs and data; a computer-readable media drive 108, such as a CD-ROM drive, for reading programs and data stored on a computer-readable medium; and a network connection 110 for connecting the computer system to other computer systems, such as via the Internet, to exchange programs and/or data—including data structures.

The facility may be described in the general context of computer-readable instructions, such as program modules, executed by computer systems 100 or other devices. Generally, program modules include routines, programs, objects, components, data structures, etc. that perform particular tasks or implement particular abstract data types. Memory 104 and persistent storage device 106 are computer-readable media that may contain instructions that implement the facility. It will be appreciated that memory 104 and persistent storage 106 may have various other contents in addition to the instructions that implement the facility.

It will be appreciated that computer systems 100 may include one or more display devices for displaying program output, such as video monitors or LCD panels, and one or more input devices for receiving user input, such as keyboards, microphones, or pointing devices such as a mouse. While computer systems 100 configured as described above are typically used to support the operation of the facility, it will be appreciated that the facility may be implemented using devices of various types and configurations, and having various components.

In the discussion that follows, embodiments of facility are described in conjunction with a variety of illustrative examples. It will be appreciated that the embodiments of facility may be used in circumstances that diverge significantly from these examples in various respects.

Figure 2:
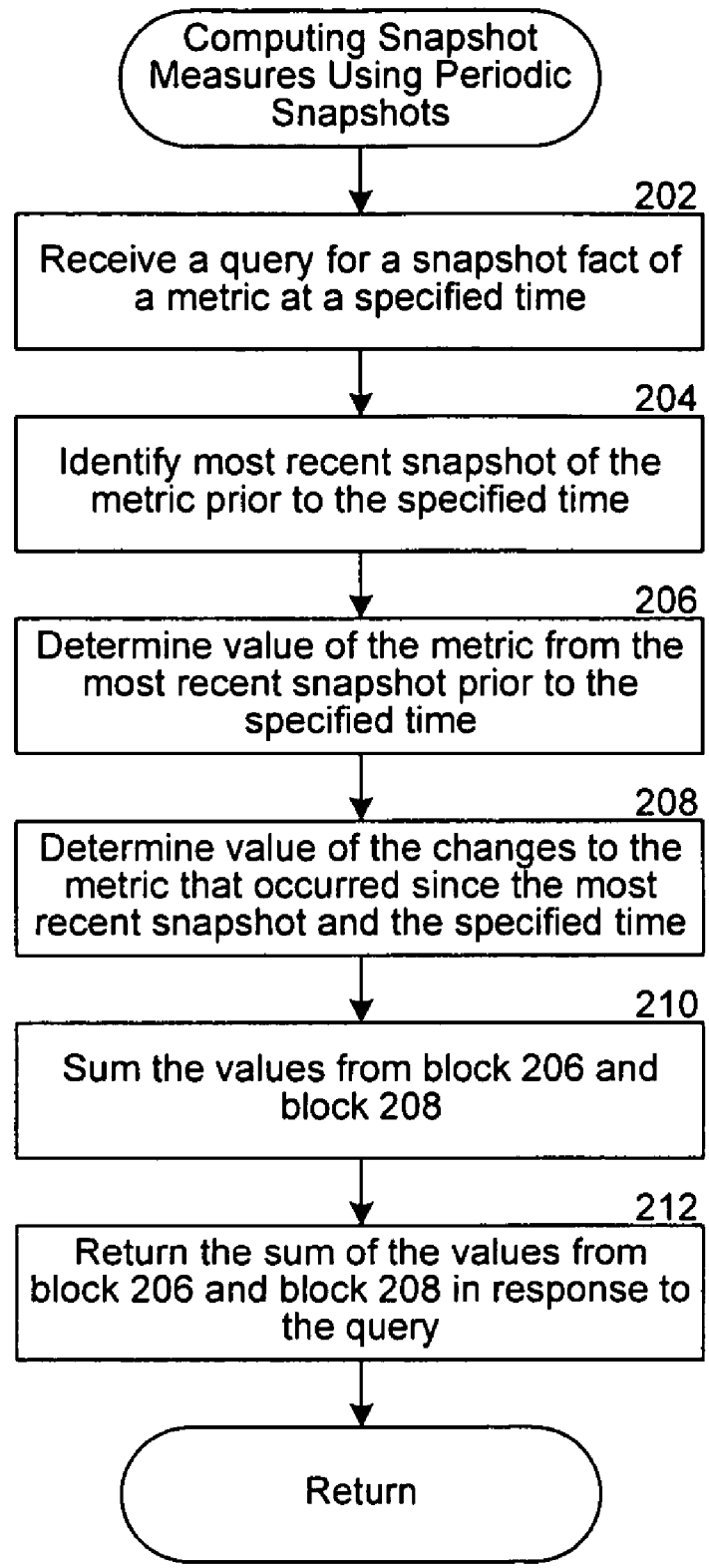
FIG. 2 is a flow diagram that illustrates a process by which the facility computes snapshot measures using periodic snapshots, according to some embodiments.

FIG. 2 is a flow diagram that illustrates a process by which the facility computes snapshot measures using periodic snapshots, according to some embodiments. In block 202, the facility receives a query for a snapshot fact of a metric at a specified time. In block 204, the facility identifies the most recent snapshot of the metric that was taken (i.e., recorded) prior to the specified time. In block 206, the facility determines the value of the metric from the identified most recent snapshot of the metric prior to the specified time. In block 208, the facility determines the value of the changes to the metric that occurred since the time the most recent snapshot of the metric was taken and the specified time. In block 210, the facility sums the value of the metric from the identified most recent snapshot of the metric prior to the specified time (the value from block 206) and the value of the changes to the metric that occurred since the time the most recent snapshot of the metric was taken and the specified time (the value from block 208). In block 212, the facility returns the sum of the value of the metric from the identified most recent snapshot of the metric prior to the specified time and the value of the changes to the metric that occurred since the time the most recent snapshot of the metric was taken and the specified time (the value from block 210) in response to the query.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps.

Figure 3:
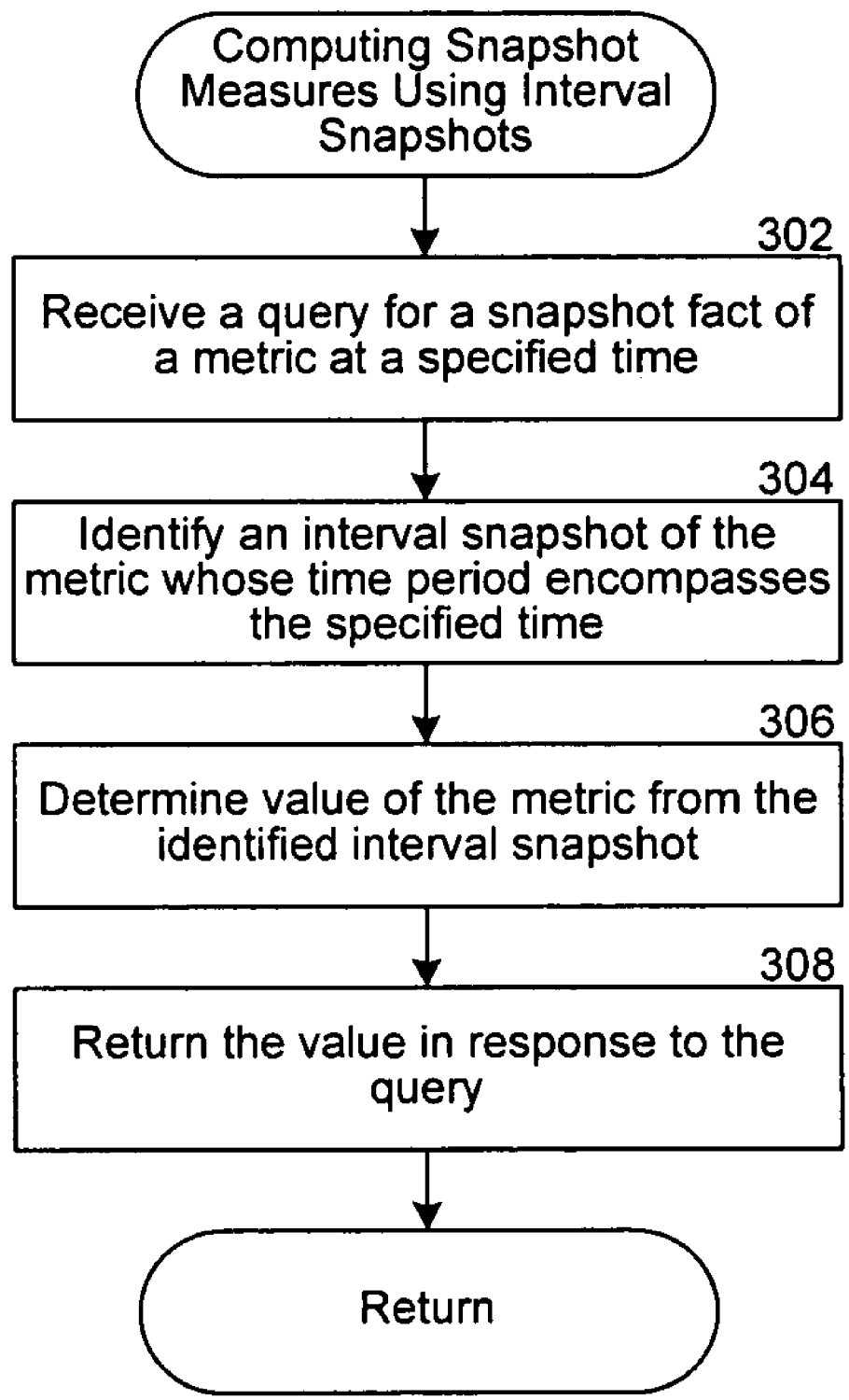
FIG. 3 is a flow diagram that illustrates a process by which the facility computes snapshot measures using interval snapshots, according to some embodiments.

FIG. 3 is a flow diagram that illustrates a process by which the facility computes snapshot measures using interval snapshots, according to some embodiments. In block 302, the facility receives a query for a snapshot fact of a metric at a specified time. In block 304, the facility identifies an interval snapshot of the metric whose time period encompasses the specified time. In block 306, the facility determines the value of the metric from the identified interval snapshot. In block 308, the facility returns the value of the metric determined in block 306 in response to the query.

Figure 4:
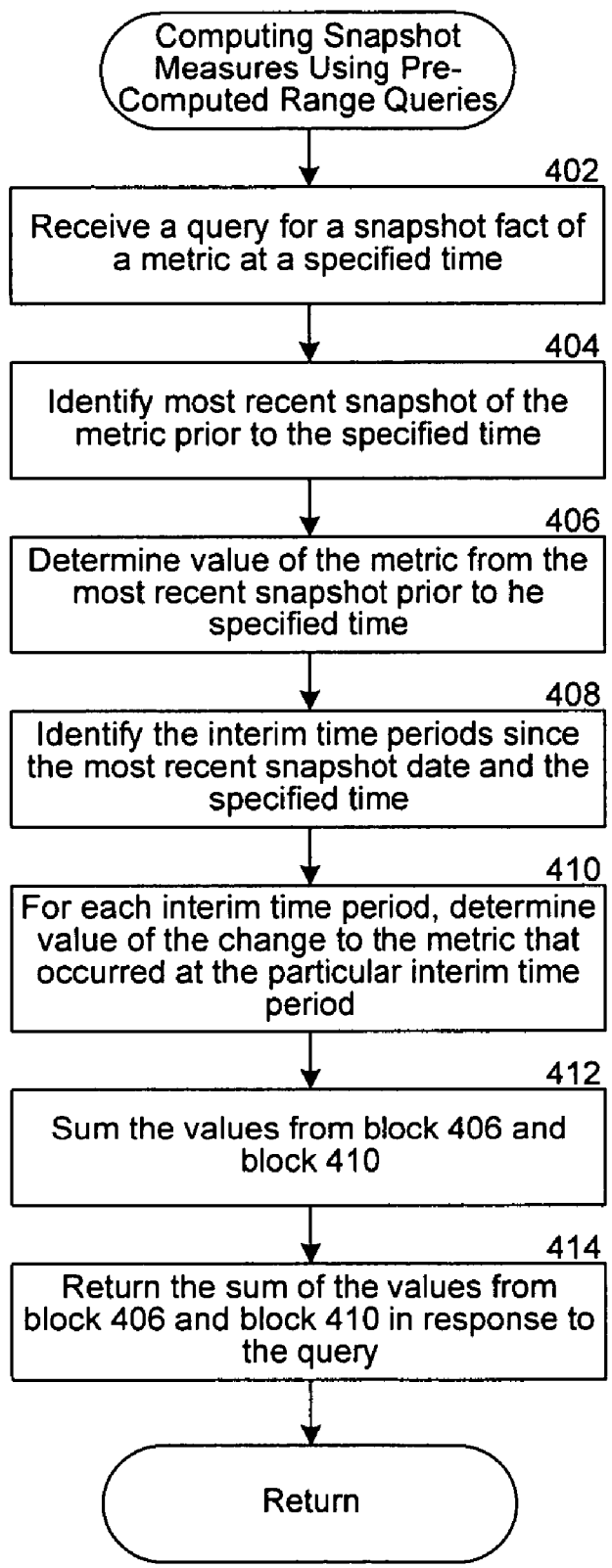
FIG. 4 is a flow diagram that illustrates a process by which the facility computes snapshot measures using pre-computed range queries, according to some embodiments.

FIG. 4 is a flow diagram that illustrates a process by which the facility computes snapshot measures using pre-computed range queries, according to some embodiments. In block 402, the facility receives a query for a snapshot fact of a metric at a specified time. In block 404, the facility identifies the most recent snapshot of the metric that was taken prior to the specified time. In block 406, the facility determines the value of the metric from the identified most recent snapshot of the metric prior to the specified time. In block 408, the facility identifies the interim time periods (e.g., number of hours, days, weeks, etc.) since the most recent snapshot date (i.e., time) and the specified time. In block 410, the facility, for each interim time period identified in block 408, determines the value of the change to the metric that occurred at the particular time period. In block 412, the facility sums the value of the metric from the identified most recent snapshot of the metric prior to the specified time (the value from block 406) and the values of the changes to the metric that occurred at each of the identified time periods (the sum of the values from block 410). In block 414, the facility returns the sum of the value of the metric from the identified most recent snapshot of the metric prior to the specified time and the values of the changes to the metric that occurred at each of the identified time periods (the value from block 412) in response to the query.

Figure 5:
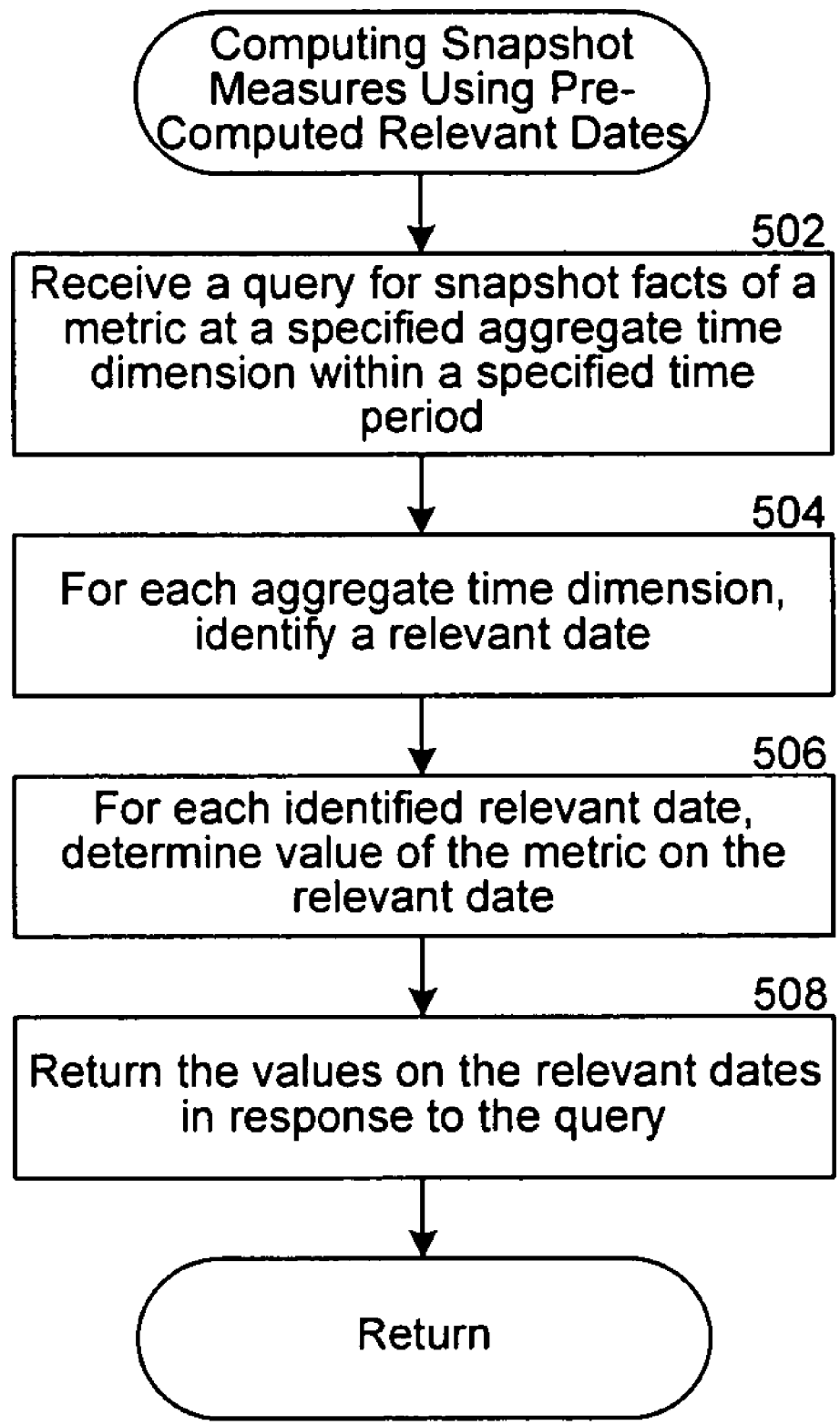
FIG. 5 is a flow diagram that illustrates a process by which the facility computes snapshot measures using pre-computed relevant dates, according to some embodiments.

FIG. 5 is a flow diagram that illustrates a process by which the facility computes snapshot measures using pre-computed relevant dates, according to some embodiments. In block 502, the facility receives a query for a snapshot fact of a metric at a specified aggregate time dimension within a specified period of time. In block 504, the facility, for each aggregate time dimension, identifies a relevant date. In block 506, the facility, for each relevant date identified in block 504, determines the value of the metric on the relevant date. In block 508, the facility returns the values determined in block 506 in response to the query.

Various aspects of the aforementioned techniques for efficiently storing and querying snapshot measures from a relational data warehouse will be further illustrated in conjunction with the following examples. It will be appreciated that the following examples are provided for illustration purposes and are not to be considered in any manner exhaustive or complete.

The examples presume three customers of a bank: Tom, who lives in California; Dick, who lives in Minnesota; and Harry, who also lives in Minnesota. For these three customers, the bank may maintain a customer table as follows:

| Customer | State |
|---|---|
| Tom | CA |
| Dick | MN |
| Harry | MN |

Moreover, Tom, Dick, and Harry may have each opened an account on Dec. 31, 1999, with no balance, and over the next four years made the following transactions:

| Transaction Table ||| 
|---|---|---|
| Transaction Date | Customer | Amount (Negative for withdrawal) |
| Jan. 15, 2000 | Tom | 5000 |
| May 12, 2000 | Tom | −100 |
| Dec. 20, 2002 | Tom | −500 |
| Nov. 10, 2003 | Tom | −4000 |

-continued

| Transaction Table ||| 
|---|---|---|
| Transaction Date | Customer | Amount (Negative for withdrawal) |
| Feb. 10, 2000 | Dick | 1000 |
| Apr. 7, 2001 | Dick | 5000 |
| Jul. 1, 2004 | Dick | 10000 |
| Jun. 9, 2000 | Harry | 10000 |
| May 4, 2003 | Harry | 10000 |

EXAMPLE 1

Store Periodic Snapshots and Add Transactions

The facility may record monthly periodic snapshots of account balances. For example, the facility may populate a new field in the date dimension, which is the date of the last snapshot, and maintain a periodic snapshot balance table at month end, as follows:

| Periodic Account Balance Snapshot Table ||| 
|---|---|---|
| Balance Date | Customer | Account Balance |
| Dec. 31, 1999 | Tom | 0 |
| Jan. 31, 2000 | Tom | 5000 |
| Feb. 28, 2000 | Tom | 5000 |
| Mar. 31, 2000 | Tom | 5000 |
| Apr. 30, 2000 | Tom | 5000 |
| May 31, 2000 | Tom | 4900 |
| ... | ... | ... |
| Dec. 31, 2002 | Tom | 4400 |
| ... | ... | ... |

The facility can also maintain a day table, which indicates the date of the last periodic snapshot for a given date, as follows:

| Day Table ||
|---|---|
| Date | Last Balance Date |
| Jan. 1, 2000 | Dec. 31, 1999 |
| Jan. 2, 2000 | Dec. 31, 1999 |
| Jan. 3, 2000 | Dec. 31, 1999 |
| ... | ... |
| Jan. 31, 2000 | Jan. 31, 2000 |
| Feb. 1, 2000 | Jan. 31, 2000 |
| Feb. 2, 2000 | Jan. 31, 2000 |
| ... | ... |
| Feb. 28, 2000 | Feb. 28, 2000 |
| ... | ... |

Then, when a report needs to be generated on a given day, the facility can compute the snapshot on that day by adding the last snapshot number (i.e., value) with the values of the transactions that happened since then. The join conditions between the physical tables may be:

Between the date table and snapshot table:

date.last_snapshot = snapshot."Date"

Between the date table and transaction table:

```
date.last_snapshot < transactions."Date" AND transactions."Date" <=
date1.day_id
```

The join between the date table and snapshot table is a many-to-many join, and for each date gives the value of the snapshot that immediately precedes it. The join between the date table and transaction table is also a many-to-many join, and for each date gives the transactions that occurred after the snapshot identified in the join of the date and snapshot.

The facility can then report the current balances of these customers for any given date. For example, the facility may receive a query for Tom's current balance as of Jan. 17, 2000. To determine Tom's balance on Jan. 17, 2000, the facility may perform the following:

1) From the 17 of January, the facility finds the date of the last snapshot (i.e., Dec. 31, 1999) from the day table. The facility then looks up the balance table (i.e., periodic account balance snapshot table) to find the balance on that date—i.e., 0 for Tom. The query for this may be:

```
Select date, balance from balance_table, day_table where
balanace_date=last_balance_date and date='Jan. 17, 2000'
```

2) The facility then finds the transactions from the transactions table that happened since the last snapshot—i.e., between Dec. 31, 1999 and Jan. 17, 2000—which would be +5000 for Tom. The query for this may be:

```
Select date, sum(amount) from transactions, day_table where date=
'Jan. 17, 2000' transaction_date between last_balance_date and date
```

3) The facility then adds the above two numbers—i.e., the result of the above two queries—to get the balance on that date: 0+5000=5000.

EXAMPLE 2

Store Snapshots by Interval

The facility may record snapshots of a metric only when the metric changes state. Under this technique, the snapshot table changes from:

```
Date, Other Dimensions ..., Snapshot Quantity
To
Start Date, End Date, Other Dimensions ..., Snapshot Quantity
```

The join condition between the snapshot table and the date table may be:

```
date.last_snapshot >= snapshot.start.date AND date.last_snapshot <
snapshot.end_date
```

Continuing the above bank example, the facility stores balances when they change in a balance table, as follows:

Interval Account Balance Snapshot Table

| Customer | Balance Start Date | Balance End Date | Balance |
|---|---|---|---|
| Tom | Dec. 31, 1999 | Jan. 14, 2000 | 0 |
| Tom | Jan. 15, 2000 | May 11, 2000 | 5000 |
| Tom | May 12, 2000 | Dec. 19, 2002 | 4900 |
| Tom | Dec. 20, 2002 | Nov. 09, 2003 | 4400 |
| Tom | Nov. 10, 2003 | Dec. 31, 2050 | 400 |
| Dick | Dec. 31, 1999 | Feb. 9, 2003 | 0 |
| Dick | Dec. 10, 2003 | Apr. 6, 2001 | 1000 |
| Dick | Apr. 7, 2001 | Jun. 30, 2001 | 6000 |
| Dick | Jul. 1, 2001 | Dec. 31, 2050 | 16000 |
| Harry | Dec. 31, 1999 | Jun. 8, 2000 | 0 |
| Harry | Jun. 9, 2000 | May 3, 2003 | 10000 |
| Harry | May 4, 2004 | Dec. 31, 2050 | 20000 |

The above balance table has only a few rows more than the transaction table, and enables the facility to determine the balance for any given day in a simple manner. For example, the facility may receive a query for Tom's current balance as of Jan. 17, 2000. To determine Tom's balance on Jan. 17, 2000, the facility may perform the following:

```
Select balance from balance_table (i.e., interval account balance
snapshot table) where 'Jan. 17, 2000' between
balance_start_date and balance_end_date
```

EXAMPLE 3

Pre-Compute Range Queries—e.g., Materializing Range Queries

Both the aforementioned periodic snapshot technique and the interval snapshot technique require a user to pose a range query (by time). Depending on the target database, range queries can be significantly slower than equality queries. In the spirit of data warehousing, it may be possible to eliminate some bad performing joins by introducing some redundancy in the data model. The materializing range queries technique converts the range query or queries to equality conditions.

For example, in the periodic snapshot technique, the join condition for the transactions join was:

```
date.last_snapshot < transactions."Date" AND transactions."Date" <=
date1.day_id
```

Assuming the dates are as follows:

| Query Date | Last Snapshot |
|---|---|
| 1 | 1 |
| 2 | 1 |
| 3 | 1 |
| 4 | 1 |
| 5 | 1 |
| 6 | 1 |
| 7 | 1 |
| 8 | 8 |
| 9 | 8 |
| 10 | 8 |
| 11 | 8 |

-continued

| Query Date | Last Snapshot |
|---|---|
| 12 | 8 |
| 13 | 8 |
| 14 | 8 |

Then the range query introduces, for all dates, the dates preceding it but with the same snapshot. For example, for the second (i.e., query date=2) the pre-compute range queries technique counts all transactions that occurred on the $2^{nd}$ For the transactions measure for the $7^{th}$, the pre-compute range queries technique counts all transactions from the $2^{nd}$ through the $7^{th}$. Therefore,

| Query Date | Date of Transactions to be Counted |
|---|---|
| 2 | 2 |
| ... | ... |
| 7 | 2 |
| 7 | 3 |
| 7 | 4 |
| 7 | 5 |
| 7 | 6 |
| 7 | 7 |
| 9 | 9 |
| 10 | 9 |
| 10 | 10 |
| ... | ... |
| ... | ... |

A similar approach may be applied for the range join created by the interval snapshot technique. Instead of the range join, date.last_snapshot>=snapshot.start.date AND date.last_snapshot<snapshot.end_date, all rows between the start date can be pre-computed. For example:

| Customer | [Balance] Start Date | [Balance] End Date | Balance | Query Date |
|---|---|---|---|---|
| ... | 1 | 3 | ... | 1 |
| ... | 1 | 3 | ... | 2 |
| ... | 1 | 4 | ... | 1 |
| ... | 1 | 4 | ... | 2 |
| ... | 1 | 4 | ... | 3 |
| ... | 2 | 3 | ... | 2 |
| ... | ... | ... | ... | ... |

Unlike the transactions tables, this interval definition table can become rather large because of the large number of combinations between the start and end dates. However, this can be controlled by ensuring within ETL that no snapshot intervals are longer than a predetermined value, such as, by way of example, ten weeks.

Continuing the above bank example, the facility may maintain a day table similar to the table maintained in the store periodic snapshots and add transactions technique, which indicates the date of the last periodic snapshot for a given date, as follows:

Day Table

| Date | Last Balance Date |
|---|---|
| Jan. 1, 2000 | Dec. 31, 1999 |
| Jan. 2, 2000 | Dec. 31, 1999 |
| Jan. 3, 2000 | Dec. 31, 1999 |
| ... | ... |
| Jan. 31, 2000 | Jan. 31, 2000 |
| Feb. 1, 2000 | Jan. 31, 2000 |
| Feb. 2, 2000 | Jan. 31, 2000 |
| ... | ... |
| Feb. 28, 2000 | Feb. 28, 2000 |

The facility may maintain another table, such as a day helper table, which represents the days between the date and the last_balance_date, as follows:

Day Helper Table

| Period End date | Period Start Date | Interim date |
|---|---|---|
| Jan. 1, 2000 | Dec. 31, 1999 | Jan. 1, 2000 |
| Jan. 2, 2000 | Dec. 31, 1999 | Jan. 1, 2000 |
| Jan. 2, 2000 | Dec. 31, 1999 | Jan. 2, 2000 |
| Jan. 3, 2000 | Dec. 31, 1999 | Jan. 1, 2000 |
| Jan. 3, 2000 | Dec. 31, 1999 | Jan. 2, 2000 |
| Jan. 3, 2000 | Dec. 31, 1999 | Jan. 3, 2000 |
| Jan. 4, 2000 | Dec. 31, 1999 | Jan. 1, 2000 |
| Jan. 4, 2000 | Dec. 31, 1999 | Jan. 2, 2000 |
| Jan. 4, 2000 | Dec. 31, 1999 | Jan. 3, 2000 |
| Jan. 4, 2000 | Dec. 31, 1999 | Jan. 4, 2000 |
| ... | | |
| Feb. 1, 2000 | Jan. 31, 2000 | Feb. 1, 2000 |
| Feb. 2, 2000 | Jan. 31, 2000 | Feb. 1, 2000 |
| Feb. 2, 2000 | Jan. 31, 2000 | Feb. 2, 2000 |

In the helper table above, the interim time period is a day (i.e., one day). One skilled in the art will appreciate that other time periods, such as, by way of example, a number of hours, two days, one week, two weeks, one month, etc., may have been used to create the helper table. The time period may be based at least in part on the metric being measured.

The facility can then report the current balances of these customers for any given date. For example, the facility may receive a query for Tom's current balance as of Jan. 17, 2000. To determine Tom's balance on Jan. 17, 2000, the facility may perform the following:

1) From the 17 of January, the facility finds the date of the last snapshot (i.e., Dec. 31, 1999) from the day table. The facility then looks up the balance table (i.e., periodic account balance snapshot table) to find the balance on that date—i.e., 0 for Tom. The query for this may be:

Select date, balance from balance_table, day_table where balanace_date=last_balance_date and date='Jan. 17, 2000'

2) The facility then finds the transactions from the transactions table that happened since the last snapshot—i.e., between Dec. 31, 1999 and Jan. 17, 2000—which would be +5000 for Tom. The query for this may be:

```
Select date, sum(amount) from transactions, day_table, day_helper_table
where date='Jan. 17, 2000' and transaction_date=interim_date and
date=period_end_date and last_balance_date=period_start_date
```

3) The facility then adds the above two numbers—i.e., the result of the above two queries—to get the balance on that date: 0+5000=5000.

Stated another way, the facility replaced or rewrote the second query—i.e., the range query—from the above store periodic snapshots and add transactions query:

```
Select date, sum(amount) from transactions, day_table where
date='Jan. 17, 2000' transaction_date between last_balance_date and
date,
``` with the following query:

```
Select date, sum(amount) from transactions, day_table,
day_helper_table
where date='Jan. 17, 2000' and transaction_date=interim_date and
date=period_end_date and last_balance_date=period_start_date.
```

In this manner, the facility eliminated the query having a "between operator" (i.e., a range query), and replaced it with a query having a '=' which can be executed faster on databases.

Pre-Compute Relevant Dates—e.g., Computing Last Using a Stored Date

Continuing the above bank example, a traditional storage of balance by day may be maintained in a balance table as follows:

| Date | Customer | Balance |
|---|---|---|
| Jan. 1, 2000 | Tom | 0 |
| Jan. 2, 2000 | Tom | 0 |
| Jan. 3, 2000 | Tom | 0 |
| ... | | |
| Jan. 15, 2000 | Tom | 5000 |
| Jan. 16, 2000 | Tom | 5000 |
| ... | | |
| Dec. 20, 2002 | Tom | 4900 |
| ... | ... | ... |

Then, to determine the monthly balance for Tom in the year 2000 (where "monthly balance" is defined as the balance on the last day of the month), one may conduct a query as follows:

```
Select customer, month, last(balance) from balances where
customer='Tom'
and year=2000 group by customer, month
```

The above query looks at 365 records, sorts them (sorting is an expensive operation), and then throws away all but twelve records to produce the output as follows:

| Month | Customer | Balance |
|---|---|---|
| January | Tom | 0 |
| February | Tom | 5000 |
| ... | | |
| December | Tom | 4900 |

In the pre-compute relevant dates technique, the facility may maintain a helper table, which, for each month in the year, stores the last day of the month, as follows:

| End Date Table | | |
|---|---|---|
| Year | Month | Last Day Of period |
| 2000 | January | Jan. 31, 2000 |
| 2000 | February | Feb. 28, 2000 |
| ... | | |

The facility can then report the monthly balances of these customers for any given year. For example, the facility may receive a query for Tom's monthly balances in the year 2000. To determine the monthly balances for Tom in the year 2000, the facility the following:

```
Select customer, month, balance from balances, end_date_table where
customer='Tom' and year=2000 and balance_date=last_day_of_period
group by customer, month
```

The above query retrieves only the twelve relevant records, resulting in a 30× reduction in records processed.

While this technique provides faster query times and the advantage of being combined with the aforementioned modeling techniques, this technique is not suited to answering rare queries, such as, by way of example, "select inventory where month >11."

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method in a computer system for processing snapshot measures, the method comprising:
dividing a metric into a set of volatile parts and a set of non-volatile parts;
storing periodic snapshots of said set of volatile parts, wherein a time duration between a pair of periodic snapshots is fixed and predetermined;
storing interval snapshots of said set of non-volatile parts, wherein an interval snapshot of said set of non-volatile parts is recorded only upon detecting a change in the state of at least one of said non-volatile parts;
upon receiving a query for a snapshot fact of said metric at a specified time, performing the following for said set of volatile parts:
identifying a most recent periodic snapshot of the set of volatile parts prior to the specified time;
determining a first value of the metric from the identified most recent periodic snapshot;

determining a second value of the changes to the metric that occurred since the most recent periodic snapshot and the specified time;

summing the first value of the metric and the second value of the changes to the metric, thereby generating a summed value; and performing the following for said set of non-volatile parts:

identifying an interval snapshot of said set of non-volatile parts whose time period encompasses the specified time; and determining a third value of the metric from the identified interval snapshot.

2. The method of claim 1, wherein the metric defines a state of a business.

3. The method of claim 1 further comprising returning at least one of the summed value of the metric and the third value of the metric in response to the received query.

4. The method of claim 1, wherein the metric is a number of open accounts.

5. The method of claim 1, wherein the metric is a number of open bugs.

6. The method of claim 1, wherein each interval snapshot comprises a start time and an end time.

* * * * *

UNITED STATES PATENT AND TRADEMARK OFFICE
CERTIFICATE OF CORRECTION

| | |
|---|---|
| PATENT NO. | : 7,711,709 B2 |
| APPLICATION NO. | : 11/314733 |
| DATED | : May 4, 2010 |
| INVENTOR(S) | : Ashish Mittal et al. |

Page 1 of 1

It is certified that error appears in the above-identified patent and that said Letters Patent is hereby corrected as shown below:

On sheet 4 of 5, in Figure 4, line 2, box "406" delete "he" and insert -- the --, therefor.

In column 9, line 27, delete "balanace_date" and insert -- balance_date --, therefor.

In column 11, line 15, delete "2$^{nd}$ For" and insert -- 2$^{nd}$. For --, therefor.

In column 12, line 61, delete "balanace_date" and insert -- balance_date --, therefor.

In column 14, line 27, after "the facility" insert -- may perform --.

Signed and Sealed this
Fifth Day of April, 2011

David J. Kappos
*Director of the United States Patent and Trademark Office*